(12) United States Patent
Bajaj

(10) Patent No.: US 9,886,336 B2
(45) Date of Patent: Feb. 6, 2018

(54) AUTOMATIC FILING OF A TASK FOR APPLICATION CRASHES

(71) Applicant: Facebook, Inc., Menlo Park, CA (US)

(72) Inventor: Manish Bajaj, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 141 days.

(21) Appl. No.: 14/925,801

(22) Filed: Oct. 28, 2015

(65) Prior Publication Data

US 2017/0123887 A1    May 4, 2017

(51) Int. Cl.
    *G06F 11/07* (2006.01)

(52) U.S. Cl.
    CPC ........ *G06F 11/0781* (2013.01); *G06F 11/079* (2013.01); *G06F 11/0754* (2013.01); *G06F 11/0772* (2013.01)

(58) Field of Classification Search
    CPC . G06F 11/0781; G06F 11/0766; G06F 11/079
    See application file for complete search history.

(56) References Cited

U.S. PATENT DOCUMENTS

| | | | | |
|---|---|---|---|---|
| 8,020,149 B2* | 9/2011 | Wolf | ............... | G06F 8/62 714/38.1 |
| 8,694,831 B2* | 4/2014 | Arapov | ............... | G06F 11/366 714/38.1 |
| 8,726,092 B1* | 5/2014 | Gray | ............... | G06F 11/079 714/38.1 |
| 8,862,947 B1* | 10/2014 | Gray | ............... | G06F 11/076 714/38.14 |
| 8,892,954 B1* | 11/2014 | Gray | ............... | G06F 8/65 714/15 |
| 9,104,797 B1* | 8/2015 | Sekhar | ............... | G06F 11/362 |
| 2006/0136784 A1* | 6/2006 | Prescott | ............... | G06F 11/0748 714/38.11 |
| 2011/0209008 A1* | 8/2011 | Arapov | ............... | G06F 11/0748 714/48 |
| 2011/0239050 A1* | 9/2011 | Malisetti | ............... | G06F 11/0709 714/37 |
| 2012/0036498 A1* | 2/2012 | Akirekadu | ............... | G06F 11/3495 717/124 |
| 2014/0149576 A1* | 5/2014 | Pavlov | ............... | G06F 11/302 709/224 |
| 2016/0092295 A1* | 3/2016 | Rajkovic | ............... | G06F 11/0781 714/49 |

* cited by examiner

Primary Examiner — Yolanda L Wilson
(74) Attorney, Agent, or Firm — Perkins Coie LLP

(57) ABSTRACT

The disclosure is directed to a crash bot that automates filing of a task for crashes in an application, e.g., a mobile app of a social networking application. The crash bot identifies various instances of crashes, e.g., a failure, of an application, identifies a root cause of the crash, generates a task with various details about the crash that may be helpful for an entity, e.g., a programmer, identifies the entity to who the task is to be assigned, and assigns the task to the identified entity automatically. The crash bot can minimize the time consumed in assigning the crashes to an entity who can resolve the crashes. The crash bot can achieve this goal by identifying crashes as soon as they occur, creating a task for the identified crashes and assigning the task to the appropriate user automatically.

20 Claims, 6 Drawing Sheets

AUTOMATIC FILING OF A TASK FOR APPLICATION CRASHES

BACKGROUND

Software applications, e.g., a social networking application, can be implemented as a mobile application ("mobile app") that can be installed on client devices, or can be implemented as a web-based application that can be accessed by end-users using a web-browser or web-browser-like application from their client devices. A software application ("application" or "app"), regardless of whether it is implemented as a mobile app or a web-based application, can crash, e.g., fail, due to an error in the source code of the application or other reasons. Typically, a crash report detailing the crash is generated when the application crashes, e.g., on a client device. The crash report is then forwarded from the client device to an application provider where typically a person in charge of processing the incoming crash reports reviews the crash report to identify an entity, e.g., a programmer, to whom the crash report is to be assigned for resolving the error. The programmer then analyzes the crash report, identifies the cause of the error, and resolves the error, e.g., by revising the source code.

This process for evaluating the crash reports and resolving the errors can be inefficient, tedious, inaccurate and cause a great deal of delay in resolving the errors. For example, having a human user review and forward the crash report to the programmer can be overwhelming or even impossible if a large number of crash reports is received, which is a possibility considering that the social networking mobile app is typically installed on millions of client devices. Further, sending the large number of crash reports to the programmer can be "spam" like, especially if a group of the crash reports are for crashes that occurred due to the same error, and the programmer may inadvertently miss reviewing one or more crash reports. Furthermore, identifying a programmer to whom a particular crash report is to be assigned can consume significant time for the human user, which can cause a delay in resolution of the error.

DETAILED DESCRIPTION

Figure 1:
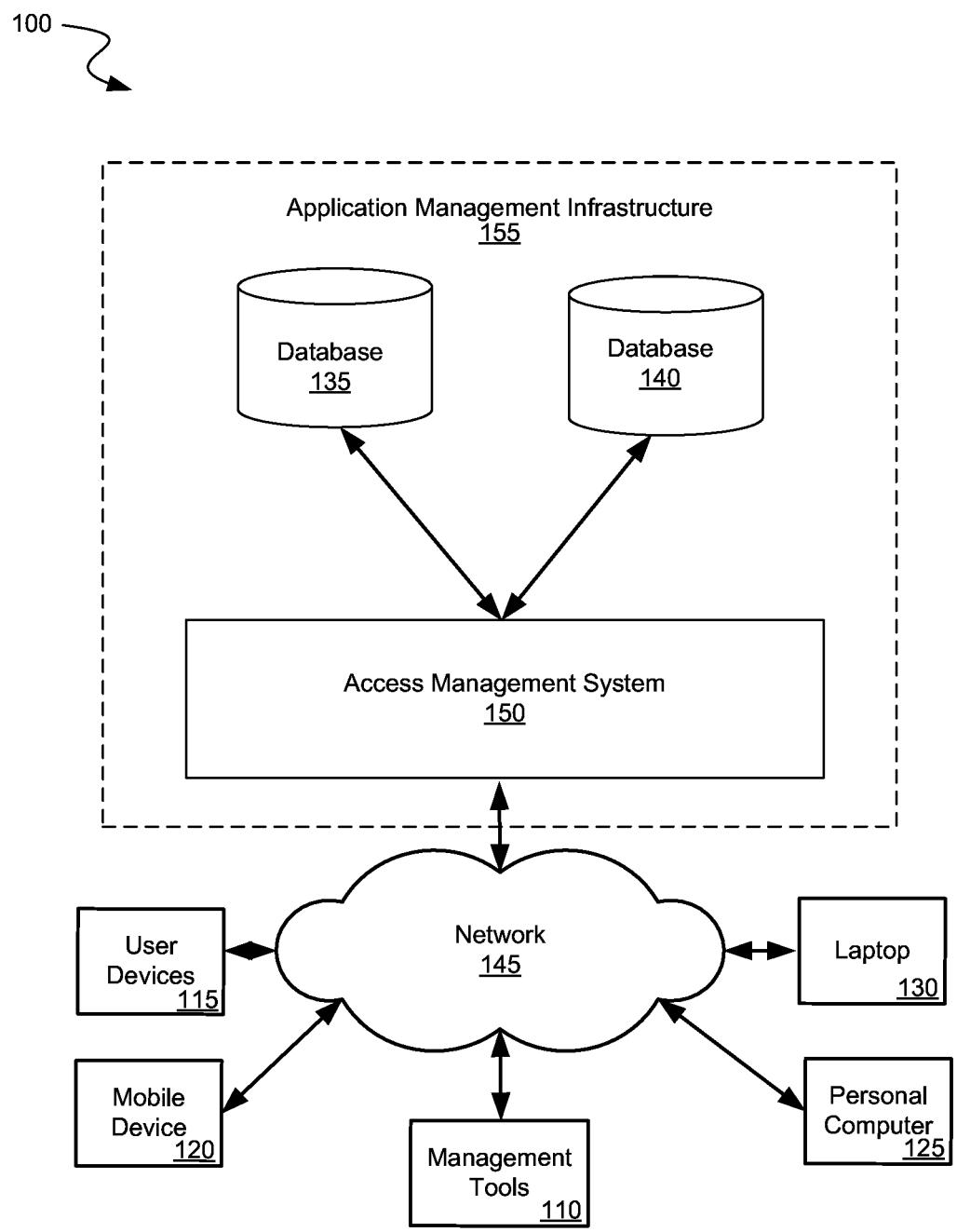
FIG. 1 depicts a block diagram illustrating an environment in which the disclosed embodiments may be implemented.

Embodiments are disclosed for a "crash bot" that automates filing of a task for crashes in an application, e.g., a mobile app of a social networking application. A "bot" is a software program that operates as an agent for a user or another program. The crash bot identifies various instances of crashes, e.g., a failure of an application, identifies a root cause of the crash, generates a task with various details about the crash that may be helpful for an entity, e.g., a programmer, in resolving the crash, identifies the entity to whom the task is to be assigned, and assigns the task to the identified entity automatically. The crash bot can minimize the time consumed in assigning the crashes to an entity who can resolve the crashes. In some embodiments, the crash bot achieves this goal by identifying crashes as soon as they occur, creating a task for the identified crashes and assigning the task to the appropriate entity.

The task can include information such as a number of crashes; a source location of a crash, e.g., a component, a module, a service or a portion of the application code that caused the application to crash; a type of a device on which the application crashed; an operating system of the device; number of people affected by the crash, etc. The crash bot determines an entity to whom the task is to be assigned based on multiple criteria. For example, the crash bot can assign the task to a user who last accessed a portion of the source code of the application from which an error that caused the crash identified by the task originates. In another example, the crash bot can assign the task to "on call" user, e.g., a user who is responsible for resolving any errors associated with the source code of the application. In yet another example, the crash bot can assign the task to an entity, e.g., an administrator, who can further identify and assign the task to the entity to whom the task is to be assigned.

In some embodiments, the crash bot identifies the crashes for which a task is to be generated based on a task generation policy, which can be defined by an entity, e.g., an administrator of the application. For example, the task generation policy can indicate that a task is to be created if a number of crashes exceeds a specified threshold. In another example, the task generation policy can indicate that the task is to be created if a metric associated with the crash, e.g., an impact of the crash, exceeds a specified threshold. The impact can be determined as a function of number of active users of the application and a number of users affected by the crash. The number of active users can be a number of users who used the application in a specified period, e.g., a day, a week, a month.

In some embodiments, the crash bot generates a task as if the number of crash reports exceeds a first threshold and the metric associated with the crashes exceed a second threshold.

The crash bot extracts the crash reports, which contain information regarding the crashes, from a storage system that stores the information regarding various crashes of an application or a set of applications. The storage system can include crash reports for each version of the application. For example, the storage report can include crash reports for an application that is in alpha stage, beta stage and a production stage. If a specified crash, e.g., which has occurred due to a specified error or of a specified component of the application, has occurred in more than one version of the application or can occur in another version of the application, e.g., because the different versions of the application share the same source code, the crash bot can create a single task for the specified crash that has occurred across different versions of the application and indicate the versions of the application that has been, would or could be affected by the crash. In some embodiments, by creating one single task for a crash, regardless of whether it occurs in one version or multiple versions of the application, the number of tasks created is minimized. Further, by indicating the versions of the application that would be affected, the users can efficiently resolve the errors in all versions.

The crash bot can be executed as a scheduled job or by an entity, e.g., an administrator, associated with the application to generate tasks based on a predefined schedule. For example, the crash bot can be executed at a regular interval, e.g., every three hours, to process the crash reports to determine if any task is to be generated for the crashes corresponding to the crash reports.

The crash bot can also facilitate tagging a task with a tag that describes a characteristic of the task. For example, if the crash reports for an application in beta version indicate that a set of crashes could be "launch blockers", e.g., errors that can prevent the application from being moved from beta version to a production version where the application is launched or made available to end-users, the crash bot can tag a task created for the set of crashes with a tag that indicates the set of crashes are "launch blockers." The entity to whom the task is assigned can read the tag and take appropriate actions in resolving the errors.

The crash bot can also facilitate in identifying a "quick experiment" to which a set of crashes are related. In some embodiments, when a new feature of an application is to be released to the end-users, the new feature is experimented by releasing it to a subset of the end-users first and then released to the remaining end-users if the number of errors occurring with respect to the new feature is less than a threshold. In some embodiments, releasing a specified version of the application, e.g., having a new feature, to a subset of the end-users for purposes of experimenting prior to releasing the specified version to a larger set of end-users is referred to as a "quick experiment." The crash bot facilitates identifying the quick experiment to which the set of crashes is associated, e.g., by analyzing the crash reports, and notifies an entity, e.g., the administrator, regarding the "quick experiment" accordingly. This can be helpful in taking appropriate actions in resolving the set of crashes. For example, if the set of crashes cannot be resolved prior to the application being launched to the end-users, the administrator can disable the "quick experiment," which removes the specified version of the application from the client devices of the subset of the end-users, thereby minimizing the number of crashes.

Turning now to the figures, FIG. 1 depicts a block diagram illustrating an environment 100 in which the disclosed embodiments may be implemented. Companies can generate and store a tremendous amount of data (e.g., photographs, messages, e-mails, electronic documents, or healthcare records) and related analytics (e.g., usage analytics). The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. In some embodiments, an application, e.g., a social networking application, can be implemented using the application management infrastructure 155 that the end-users can access to perform various activities, e.g., social networking activities. The end-users can access the application from user devices 115 associated with the end-users via the access management system 150.

User device 115 can be any computing device capable of receiving user input as well as transmitting and/or receiving data via the network 145. The user device 115 can be a conventional computer system, such as a desktop 125 or a laptop computer 130, a mobile device 120, a smartphone, or a similar device. The user device 115 is configured to communicate with access management system 150 and/or the financial account provider via the network 145. In some embodiment, user device 115 executes an application, e.g., a mobile app, allowing a user of the user device 115 to interact with the access management system 150 to access the social networking application. For example, the user device 115 can execute a browser application to enable interaction between the user device 115 and access management system 150 via the network 145. In another embodiment, user device 115 interacts with access management system 150 through an application programming interface (API) that runs on the native operating system of the user device 115, such as iOS® or ANDROID™.

The user devices 115 can be configured to communicate via the network 145, which may comprise any combination of local area and/or wide area networks, using both wired and wireless communication systems. In some embodiments, the network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 145 may be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

Figure 2:
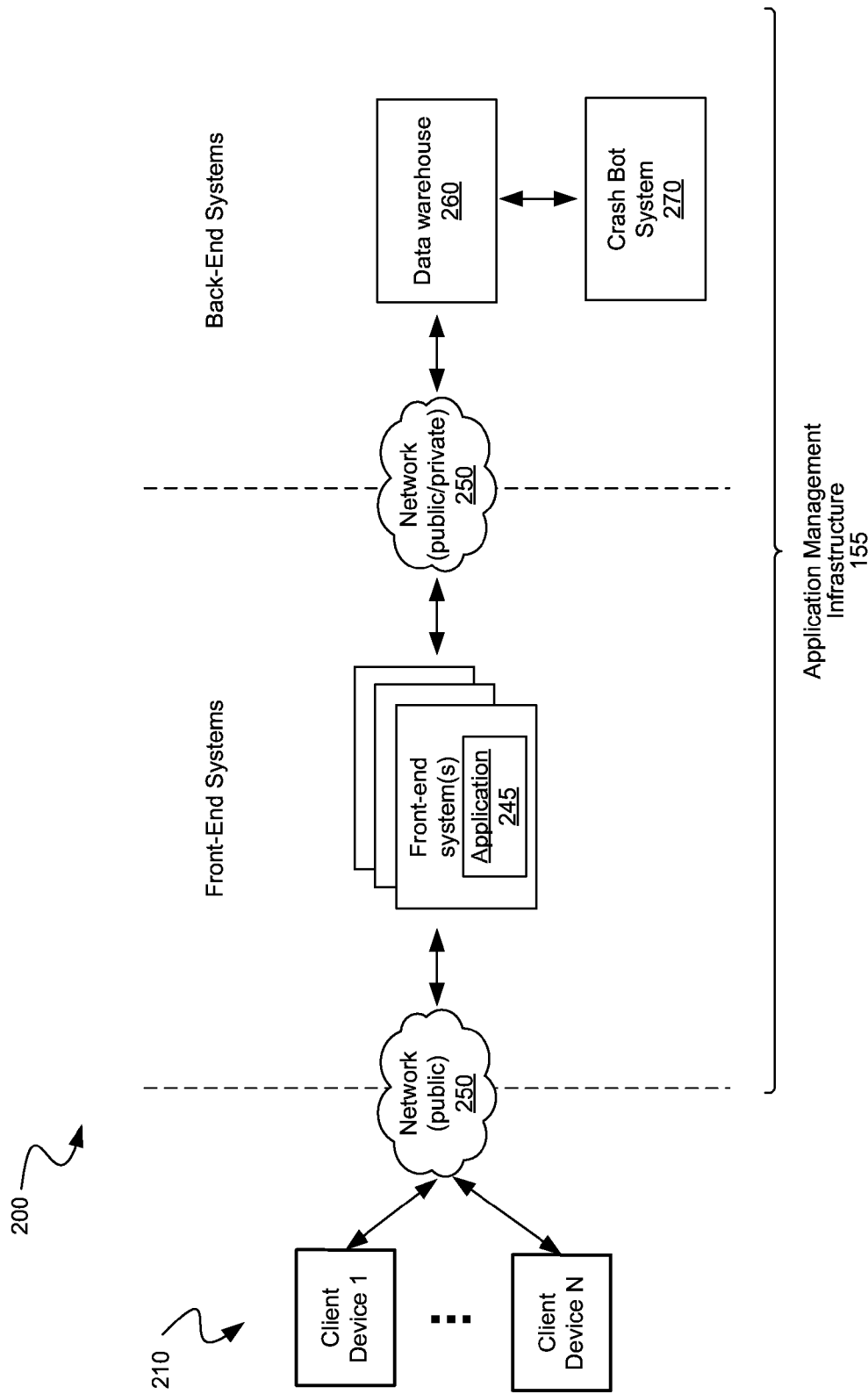
FIG. 2 depicts a block diagram illustrating a more detailed example of the application management infrastructure of FIG. 1, consistent with various embodiments.

FIG. 2 depicts a block diagram illustrating a more detailed example 200 of the application management infrastructure 155 of FIG. 1, consistent with various embodiments. The application management infrastructure 155 can include various front-end systems and back-end systems that can be physically and/or functionally distributed. As illustrated, the application management infrastructure 155 includes front-end systems, e.g., a front-end system 240, a back-end data warehouse 260, and a crash bot system 270. In some embodiments, the front end systems and the back end systems can collectively comprise the databases 135 and 140 and the access management system 150 of FIG. 1. The client devices or user devices 210 can be configured to communicate via the network 250 with the front-end system 240, the front-end system 240 can be configured to communicate with the client devices 210 and the back-end data warehouse 260 via the network 250, and the back-end data warehouse 260 can be configured to communicate with the front-end system 240 and a crash bot system 270 via the network 250. In some embodiments, the client devices 210 are similar to the user devices 115 of FIG. 1.

The front-end system 240 can host an application 245, e.g., a social networking application, that can be accessed by end-users using their associated client devices 210. In some embodiments, a portion of the application 245 is installed on the client devices 210, e.g., as a mobile app. The front-end system 240 can comprise various operational systems, e.g., server computing devices, and/or relational databases. The operational systems are typically optimized for preservation of data integrity and speed of recording transactions through use of database normalization and an entity-relationship model. Fully normalized database designs often result in information being stored in hundreds or even thousands of tables. Relational databases are efficient at managing the relationships between these tables. The databases have very fast insert/update performance because only a small amount of data in those tables is affected each time a transaction is processed. For performance and other purpose, older data is periodically purged from the front-end operational system 240 to the data warehouse 260.

The data warehouse 260 is a "functionally" central repository for data that is purged from multiple front-end (operational) systems. The data warehouse 260 is "functionally" central because it can be physically and/or functionally distributed. For example, the data warehouse 260 can include a user space for server logs associated with end-user data that can be sharded, e.g., partitioned, across any number of physical distributed machines. In some embodiments, the back-end data warehouse 260 stores various crash reports that contain information regarding crashes of an application on client devices 210 and various metrics associated with the crashes. The data warehouse 260 can store current as well as historical data. For example, the back-end data warehouse 260 can store historical user data that is ten years or older. The data warehouse 260 is commonly used for operational and development purposes including, but not limited to, data analysis.

The data warehouse 260 may take a variety of forms. In some embodiments, the data warehouse 260 is configured as a distributed file storage system, e.g., Hadoop distributed file storage (HDFS).

The crash bot system 270 can comprise various processing systems that perform the various task creation and management functions discussed herein. The various component, functions, and or tools that can be associated with and/or included within the crash bot system 270 are discussed in greater detail with reference to FIG. 3 below.

Figure 3:
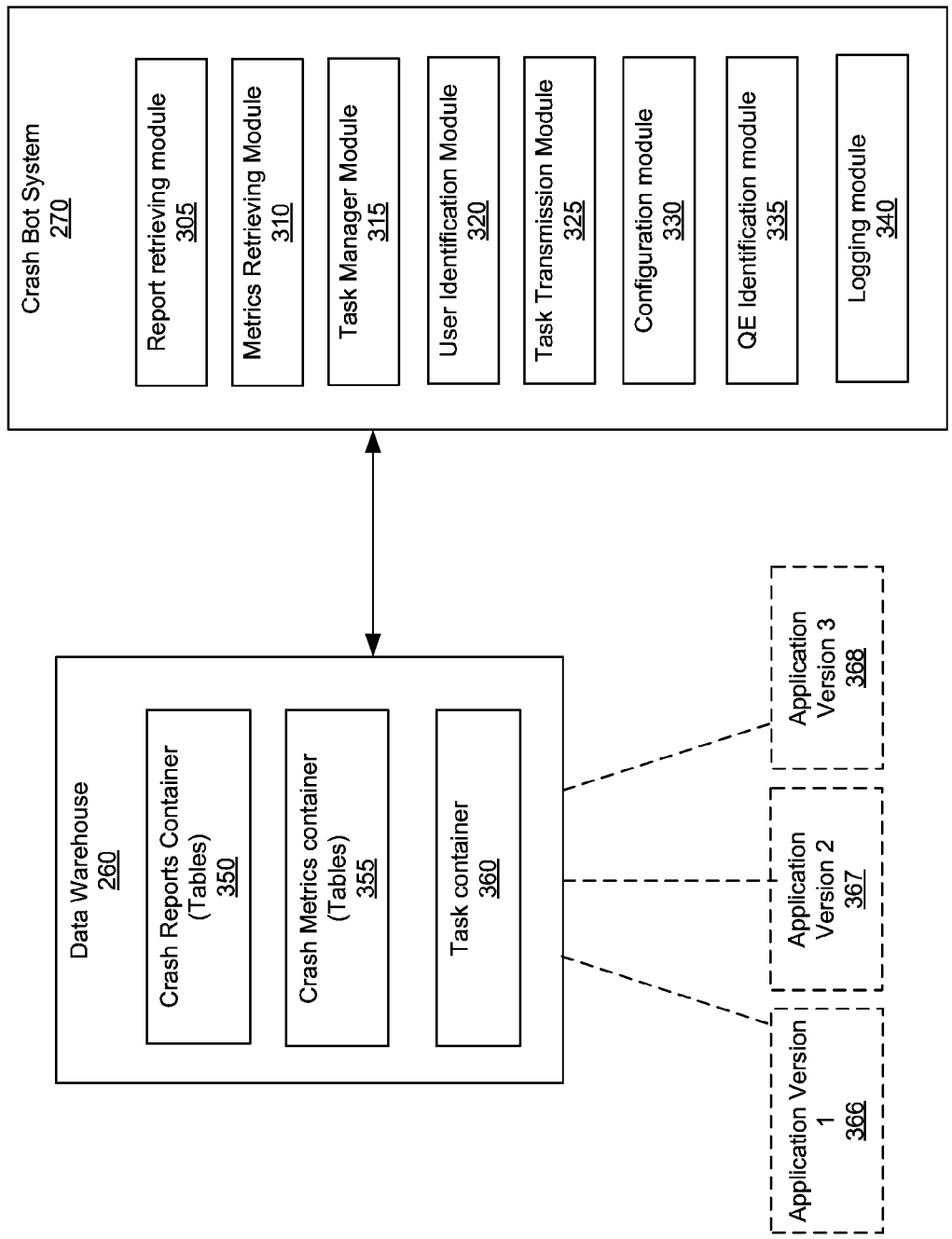
FIG. 3 is a block diagram of the back end systems of FIG. 2, consistent with various embodiments.

FIG. 3 is a block diagram of the back end systems of FIG. 2, consistent with various embodiments. The data warehouse 260 stores a variety of information about the application 245 of FIG. 2. For example, the data warehouse 260 includes a crash reports container 350 that stores crash reports, which include information about various instances of crashes of the application 245, e.g., a mobile app of the application 245 installed on the client devices 210. The application 245 can crash, e.g., fail, due to an error in the code of the application 245. For example, in a mobile app of a social networking application that is executing on a client device, if the code associated with uploading a picture is erroneous, the mobile app can crash when an end-user uploads a picture in the mobile app. In some embodiments, the entire mobile app can crash, e.g., the mobile app can abruptly shut down, or a portion of the mobile app can crash, e.g., the photo uploading process crashes but the mobile app is still executing.

When the application 245 crashes on a client device, the client device sends a crash report containing information regarding the crash to the front end system 240. The front end system 240 can then store the crash report in the data warehouse 260. Alternatively or in addition to the above, a crash report can be generated by the back end systems based on the crash information received from the client device. In some embodiments, an entity, e.g., the administrator, can supplement the crash report with additional information. In some embodiments, the crash report includes information such as a type of the client device at which the crash occurred, e.g., a smartphone, a tablet, a desktop; an operating system of the client device; a version of the application 245 executing on the client device, a stack trace of the client device, which shows where in the application 245 the error occurred.

The data warehouse 260 includes a crash metrics container 355 that stores various crash metrics. In some embodiments, a crash metric quantifies an impact of the crash. The impact of the crash can computed in various ways. For example, the impact of the crash is computed as a function of number of active end-users of the application 245 and a number of end-users affected by the crash. Various back end systems (not illustrated) can compute such crash metrics in real-time, e.g., as and when the crashes occur, or on demand, and store them in the data warehouse 260. The back end systems keep track of the number of active users of the application 245, a number of users affected by the crash and updates these numbers in real time. In some embodiments, the number of users affected by the crash can be determined based on the number of crash reports received for the crashes, e.g., that occurred due to the same error. The application 245 can crash due to various errors, e.g., an error in a specified feature of the application 245, an error in a specified component, e.g., a method, class, or file, of the application 245. The number of end-users affected by a crash due to a specified error can be determined based on the number of crash reports received for the specified error.

Various versions of the application 245 can be executing at different client devices 210. For example, a first version 366 of the application 245 can be executing at a first subset of the client devices 210, a second version 367 of the application 245 can be executing at a second subset of the client devices 210 and a third version 267 of the application 245 be executing at a third subset of the client devices 210. The data warehouse 260 can include the crash reports and the crash metrics for all versions of the application 245.

The crash bot system 270 identifies various instances of crashes of an application 245, identifies a root cause of the crash, generates a task with various details about the crash that may be helpful for an entity, e.g., a programmer, in resolving the error, identifies the entity to who the task is to be assigned, and sends/forwards/assigns the task to the identified entity automatically.

The crash bot system 270 uses the crash reports and the crash metrics in generating tasks for the crashes. The crash bot system 270 can be configured to generate a task based on a task generation policy, which can be defined in a configuration file (not illustrated). For example, the task generation policy can indicate that a task is to be created if the number of crash reports exceeds a first threshold and the metric associated with the crashes exceed a second threshold. In another example, the task generation policy can indicate that the task is to be created for most recently occurred crashes, e.g., crashes that occurred within the last one day. In yet another example, the task generation policy can indicate that the task is to be created for every specified number of crashes, e.g., every 10 crashes. In still another example, the task generation policy can indicate that the task is to be created for crashes that occur on a specified type of client devices, and/or client devices with a specified operating system, etc. The crash bot system 270 includes a configuration module 330 that can be used to define the configuration file based on the task generation policy. In some embodiments, an entity, e.g., a programmer of the application 245, an administrator or any other entity tasked with maintaining the application 245 can define the configuration file. The configuration module 330 can provide a graphical user interface (GUI) for defining the task generation policy in the configuration file.

The report retrieving module 305 of the crash bot system 270 retrieves the crash reports from the crash reports container 350 based on the configuration file. For example, if the configuration file indicates that a task is to be generated if the number of crash reports exceed a first threshold and the crash metric of each of the crashes associated with crash reports exceed a second threshold, the report retrieving module 305 retrieves the crash reports only if the number of crash reports exceed the first threshold and the crash metric exceeds the second threshold.

The metrics retrieving module 310 obtains the crash metric of each of the crashes from the crash metrics container 355. In some embodiments, the report retrieving module 305 filters out the crashes whose impact is below the second threshold and selects only those crashes whose metric exceeds the second threshold, e.g., crashes whose impact is above the second threshold.

The task manager module 315 generates tasks for each of the crashes whose impact is above the second threshold. The task manager module 315 obtains a variety of information regarding the crashes from the corresponding crash reports and records them in the tasks. A task can include information such as a number of crashes, e.g., due to a specified error; the number of crashes in a specified duration, e.g., the last one hour; a source location of a crash, e.g., a component, a module, a service or a portion of the code of the application 245 that caused the application 245 to crash; a type of the client device on which the application 245 crashed; an operating system of the client device; number of end-users affected by the crash, a version of the application 245 that crashed, a version of the application that also includes the source code that contains the error which caused the crash, etc. The task can also include links, e.g., a hyperlink, to a variety of information. For example, the task can include a link to the crash reports corresponding to the crash and a link to metrics associated with the crash.

After the task is generated, a task transmission module 325 assigns the task to a specified entity, e.g., a programmer, for resolving the crash. A user identification module 320 can identify the specified entity to whom the task is to be assigned in a number of ways. For example, the user identification module 320 identifies the specified entity by determining a user who last accessed a portion of the source code of the application 245, e.g., a file containing the portion of the source code, from which an error that caused the crash originates. In some embodiments, the user identification module 320 can use the stack trace from the corresponding crash report to determine the source code from which the error originates. In another example, the user identification module 320 can identify the specified entity by determining an "on call" user, e.g., a user who is designated as a contact person for resolving any errors associated with the application 245. In yet another example, the user identification module 320 can determine the specified entity by identifying an administrator or any other user who can further identify the entity to whom the task is to be assigned and forward the task to the identified entity.

After the user identification module 320 determines the specified entity to whom the task is to be assigned, the task transmission module 325 sends the task to the specified entity, e.g., via email, a notification in an error management application. A logging module 340 can also store the tasks in the task container 360 at the data warehouse 260.

After the task is assigned to the specified entity, the task manager module 315 can also send follow up notifications to the specified entity reminding the specified entity to resolve the errors that caused the crash. The follow up notifications can also seek the specified entity to provide a status of the resolution of the error. In some embodiments, the task manager module 315 sends the follow up schedule based on a specified schedule and/or status of the error resolution.

The task manager module 315 can also tag a task with a tag that describes a characteristic of the task. For example, if the crash reports of a beta version of the application 245 indicate that a set of crashes could be "launch blockers", e.g., errors that can prevent the application 245 from being moved from beta version to a production version in which the application 245 is launched or made available to the end-users, the task manager module 315 can tag a task created for the set of crashes with a tag, e.g., "launch blocker," that indicates the set of crashes are "launch blockers." The entity to whom the task is assigned can take appropriate actions in resolving the errors based on the tag. For example, the entity can attend to resolving the errors that caused these set of "launch blocking" crashes prior to resolving other "non-launch blocking" crashes. In order for the task manager module 315 to tag a task as "launch blocking," a threshold of the number of crashes that have to occur is different from a threshold of the number of crashes that have to occur for creating a task that is not "launch blocking." For example, the threshold of the number of crashes that have to occur for tagging a task as "launch blocking" is higher than the threshold of the number of crashes that have to occur for creating a task that is not "launch blocking."

A quick experiment (QE) identification module 335 facilitates in identifying a "quick experiment" to which a set of crashes are related. In some embodiments, when a new feature of an application is to be released to the end-users, the performance of the new feature is experimented by releasing the new feature to a subset of the end-users first, and if the performance is satisfactory to the application provider, e.g., number of errors generated are less than a specified threshold, then the new feature is released to the remaining end-users. In some embodiments, releasing a specified version of the application 245, e.g., having a new feature, to a subset of the end-users for purposes of experimenting prior to releasing the specified version to a larger set of end-users is referred to as a "quick experiment." The QE identification module 335 facilitates identifying the quick experiment to which the set of crashes is associated, e.g., by analyzing the crash reports, and notifies an entity, e.g., the administrator, regarding the "quick experiment" accordingly. This can be helpful for the entity in taking appropriate actions in resolving the set of crashes. For example, if the set of crashes cannot be resolved prior to the application 245 being launched to the end-users, the administrator can disable the "quick experiment," which removes the specified version of the application 245 from the client devices of the subset of the end-users, thereby minimizing the number of crashes.

In some embodiments, the QE identification module 335 compares the crash reports from the subset of the end-users with other end-users or other subsets of end-users to determine which of the subsets have crash reports exceeding a specified threshold. The QE identification module 335 can then identify the "quick experiment" associated with the subset whose crash reports exceed the specified threshold as the 'quick experiment" that may have to be disabled.

The logging module 340 also logs various information related to the tasks. For example, the logging module 340 can log the date and time the task is created, the reason why a task is created, etc. in the task container 360.

Figure 4:
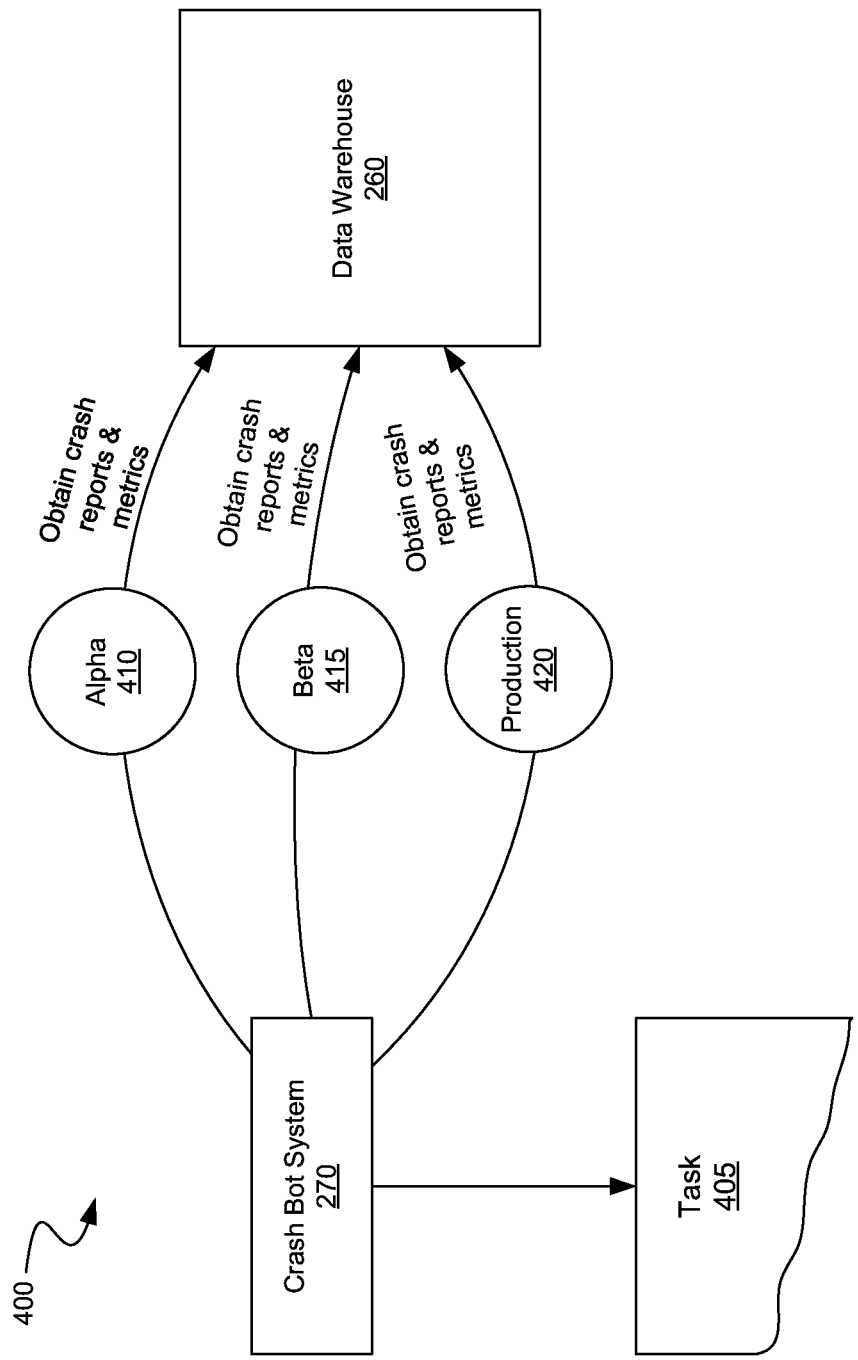
FIG. 4 is a block diagram of an example illustrating generating tasks for crashes in various versions of the application of FIG. 2, consistent with various embodiments.

FIG. 4 is a block diagram of an example 400 illustrating generating tasks for crashes in various versions of the application of FIG. 2, consistent with various embodiments. In some embodiments, the example 400 can be implemented using the crash bot system 270. The crash bot system 270 can create tasks for various versions of the application 245. In some embodiments, multiple versions of the application 245 can be implemented in the environment 100 of FIG. 1 simultaneously. For example, the application 245 can have an alpha version 410, a beta version 415 and a production version 420. In some embodiments, these versions can represent different stages in a software development lifecycle of the application 245.

In the software development lifecycle, the source code of the application 245 goes through various stages before the application 245 is "launched," e.g., made available, for all of the end-users of the application 245, a stage which is referred to as "a production version" of the application 245. For example, the alpha phase of the life cycle is the first phase to begin software testing and in this phase the application 245 is typically not available to end-users outside of the organization. The alpha version 410 can be unstable and could cause crashes or data loss. The alpha phase usually ends with a feature freeze, indicating that no more features will be added to the software. The beta stage is the software development phase following the alpha, and generally begins when the software is feature complete but likely to contain a number of known or unknown errors. The beta version 415 of the application 245 can generally have many more errors in it than the completed or final version of the application 245 ("production version"), as well as speed/performance issues and may still cause crashes or data loss. The focus of beta testing can be reducing impacts to the end-users. The process of delivering a beta version 415 to the end-users is called beta release and this is typically the first time that the application 245 is available outside of the organization that developed it. After the errors have been resolved and performance of the beta version 415 of the application is considered to be satisfactory, the application 245 is moved to the production version 420 and released to the end-users.

Referring back to the crash bot system 270, the crash bot system 270 generates tasks for crashes that may occur in any and every version of the application 245. Further, in some embodiments, for all the crashes that occur in a specified version or different versions of the application 245 due to the same error, the crash bot system 270 generates a single task and not multiple tasks, thereby minimizing spamming the entities, e.g., programmers, with multiple tasks that are addressing the crashes due to the same or similar error. In some embodiments, an entity, e.g., an administrator can define the criteria for considering two different crashes to be similar or the errors that caused these crashes to be similar. For example, if a single fix/correction to the source code of the application 245 resolves the error that caused the two different crashes, regardless of whether the two crashes are in the same version or different versions of the application 245, then the two crashes are considered to be similar.

For each of the version of the application 245, the crash bot system 270 retrieves the crash reports, e.g., from the crash reports container 350, that have to be filed as tasks. In some embodiments, the crash bot system 270 retrieves the crash reports based on the configuration file, which specifies the task generation policy. As described above at least with reference to FIG. 3, the task generation policy can indicate a task may be generated if the number of crashes exceeds a first threshold and the metric associated with the crash exceeds a second threshold. Further, the task generation policy can be different for different versions of the application 245.

After retrieving the crash reports from each version of the application 245, the crash bot system 270 groups the crashes that are considered to be similar into one group and generates a single task 405 for the crashes in the group. The crash bot system 270 can generate a task for each such group of crashes and assign the task to an appropriate entity, e.g., determined as described at least with reference to FIG. 3.

In some embodiments, the application 245 can have at least a portion of the source code that is same across the different versions. So, if a crash causing error is present in a specified portion of the source code in one version, the crash causing error can also be present in other versions having the same portion of the source code. Accordingly, some crashes that have occurred in the beta version 415 can also occur in the production version 420. When a task is generated for the crashes in the beta version 415, the task manager module 315 can also indicate in the task that the crash could also occur in another version of the application 245, e.g., production version 420, and a reason why the crash could occur, e.g., the production version 420 has the same source code as the beta version 415 from which the error originated.

In some embodiments, the crash bot system 270 can also identify crashes that are occurring in one version but not the other and generate tasks for those crashes. That is, the crash bot system 270 can facilitate identifying errors that are in one version but not the other and generate tasks for only those errors. For example, the crash bot system 270 can identify the crash causing error that is present in the beta version 415 but not present in the production version 420. The crash bot system 270 can identify this error as a new error, and generate a task for the new error so that an entity, e.g., a programmer, can resolve the new error before the application 245 is moved to the production version 420.

Figure 5:
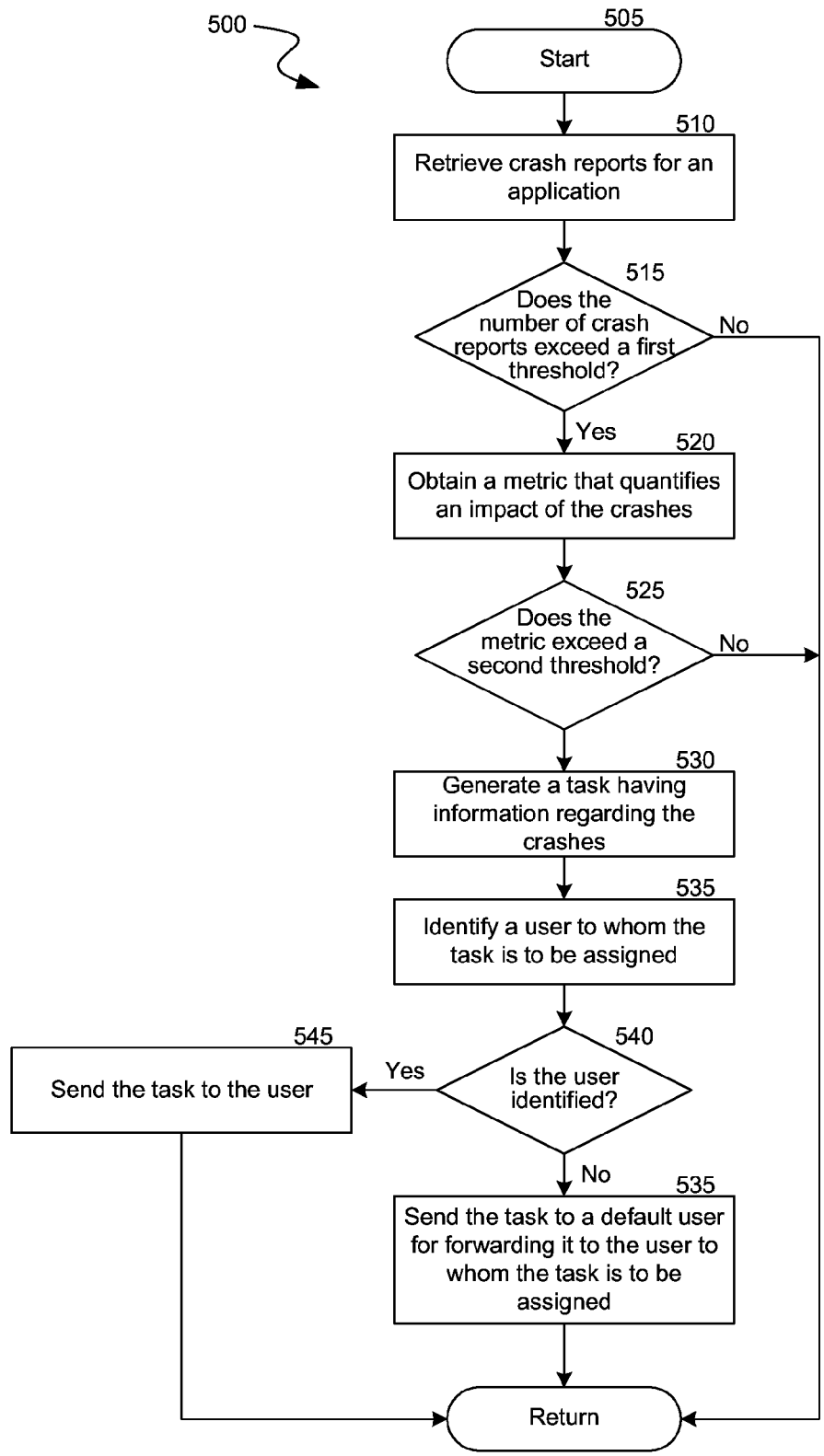
FIG. 5 is a flow diagram of a process for generating a task for an application crash, consistent with various embodiments.

FIG. 5 is a flow diagram of a process 500 for generating a task for an application crash, consistent with various embodiments. In some embodiments, the process 500 can be implemented in the environment 100 of FIG. 1 and using the crash bot system 270 of FIG. 2. The process 500 begins at block 505, and at block 510, the report retrieving module 305 retrieves crash reports for an application, e.g., the application 245, from the crash reports container 350. In some embodiments, a crash report indicates that the application 245 crashed at a particular client device and includes information regarding the crash. The application 245 can be a mobile app that is installed on one or more client device 210 or can be server-based and accessed by the end-users using a web browser on their associated client device. In some embodiments, the application 245 is a mobile app that is installed on one or more client devices 210.

The report retrieving module 305 retrieves the crash reports based on a configuration file, which includes a task generation policy for generating a task. Accordingly, at decision block 515, the report retrieving module 305 determines if the number of crash reports exceed a first threshold. If the number of crash reports does not exceed the first threshold, the process 500 returns. On the other hand, if the number of crash reports exceeds the first threshold, at block 520, the metrics retrieving module 310 obtains a metric associated with a crash of the each of the crash reports. The metric can quantify an impact of the crash, e.g., indicates a percentage of end-users that are affected by the crash. In some embodiments, the percentage of end-users that are affected by the crash is determined as a function of number of active users of the application 245 and a number of end-users affected by the crash.

At decision block 525, the report retrieving module 305 determines whether the metric of a crash exceeds a second threshold. If the metric does not exceed the second threshold the process 500 returns. On the other hand if the metric exceeds the second threshold, at block 530, the task manager module 315 generates a task, e.g., task 405, for the crash. The task includes various details that can be helpful for an entity, e.g., a programmer, in resolving the error that caused the crash. For example, the task can include information such as a number of crashes that occurred; the number of crashes in a specified duration, e.g., the last one hour; a source location of the crash, e.g., a component, a module, a service or a portion of the source code of the application 245 that caused the application 245 to crash; a type of the client device on which the application 245 crashed; an operating system of the client device; a number of end-users affected by the crash, a version of the application 245 that crashed, a version of the application 245 that also can crash, e.g., because it includes the same source code that contains the error which caused the crash, etc. The task can also include links, e.g., a hyperlink, to a variety of information. For example, the task can include a link to the crash reports corresponding to the crash and a link to metrics associated with the crash. The task manager module 315 can obtain some or all of the above information from the corresponding crash reports.

After the task is generated, the task may have to be assigned to a specified entity, e.g., a programmer, for resolving the crash. At block 535, the user identification module 320 identifies the specified entity to whom the task is to be assigned. The user identification module 320 can determine the specified entity in a number of ways, e.g., as described at least with reference to FIG. 3.

At decision block 540, the task transmission module 325 determines if the specified entity has been identified. If the specified entity has been identified, at block 545, the task transmission module 325 sends the task to the specified entity, e.g., via email or a notification in an error resolution application. On the other hand, if the specified entity is not identified, at block 550, the task transmission module 325 can send the task to an "on call" user, an administrator or any other user who can forward the task to a user who can resolve the error which caused the crash.

In some embodiments, the crash bot system can perform the above method, e.g., described with reference to blocks 530-550 for each of the crashes that satisfies the task generation policy (e.g., described with reference to blocks 515 and 525).

Figure 6:
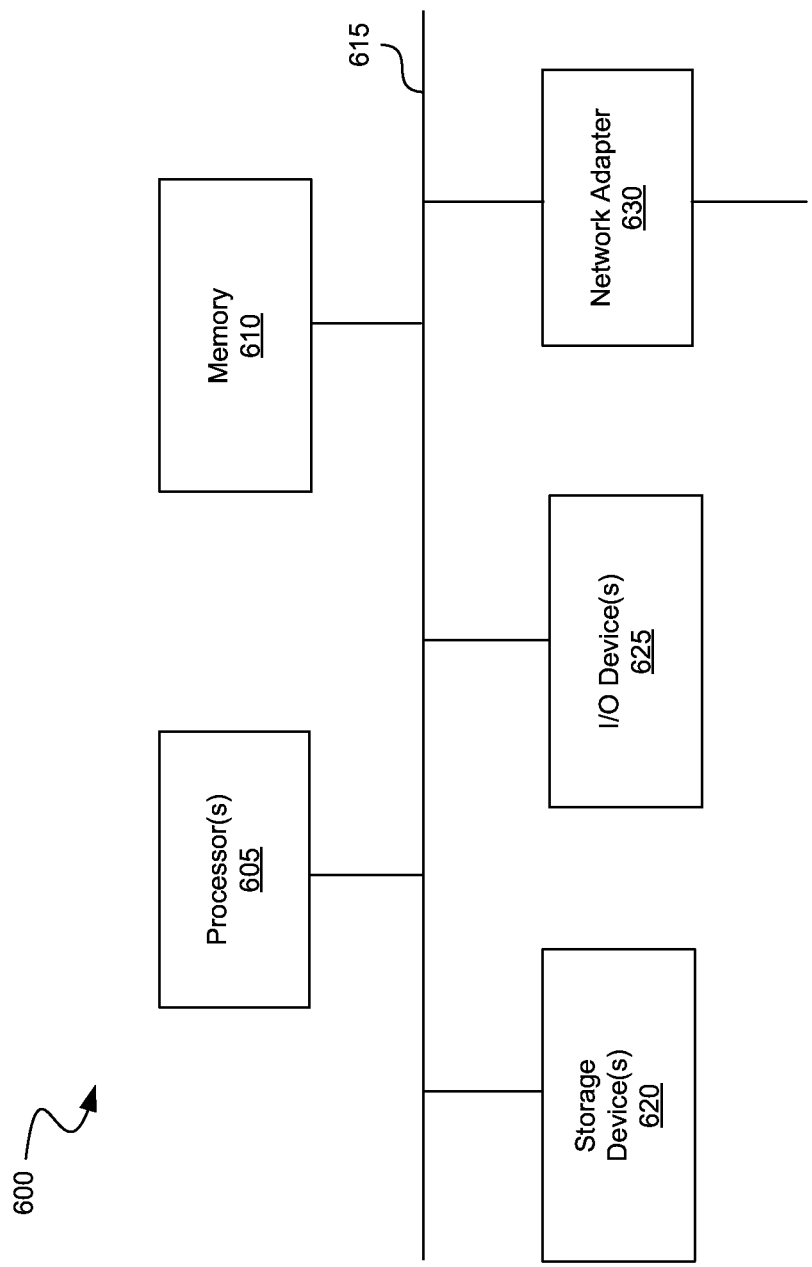
FIG. 6 is a block diagram of a processing system that can implement operations of the disclosed embodiments.

FIG. 6 is a block diagram of a computer system as may be used to implement features of the disclosed embodiments. The computing system 600 may be used to implement any of the entities, components or services depicted in the examples of the foregoing figures (and any other components and/or modules described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method performed by a computing system, comprising:
    retrieving, by the computing system and from a first data source, multiple crash reports of an application, wherein a specified crash report of the multiple crash reports includes information regarding an error that caused the application to crash, wherein different crash reports are generated for crashes caused by different errors;
    obtaining, by the computing system and from a second data source, a metric associated with the crash, the metric quantifying an impact of the crash;
    determining if the metric exceeds a specified threshold; and
    responsive to a determination that the metric exceeds the specified threshold, generating a task having information regarding the crash, the information obtained from the specified crash report.

2. The method of claim 1 further comprising:
    assigning the task to a user to resolve the error that caused the crash.

3. The method of claim 2, wherein assigning the task to the user includes:
    identifying, using the specified crash report, a component of the application at which the error that caused the crash is originating from, and
        determining a specified user who last accessed the component as the user.

4. The method of claim 2, wherein assigning the task to the user includes sending the task to a specified user for forwarding to the user associated with a component of the application at which the error that caused the crash is originating from.

5. The method of claim 2 further comprising:
    sending a notification to the user, the notification requesting the user to provide a status regarding resolving the error.

6. The method of claim 1, wherein generating the task includes:
    retrieving, from the first data source, the crash reports for each of multiple versions of the application,
    identifying, using the crash reports, crashes in each of the versions of the application that are caused by the error, and
    merging the information regarding the crashes into the task in an event the metric associated with the crashes exceed the specified threshold.

7. The method of claim 1, wherein generating the task includes generating the task in an event a number of crash reports generated for the crashes caused by the error exceeds a specified threshold.

8. The method of claim 1, wherein generating the task includes:
    generating, in the task, a link to a crash report that includes information regarding the error that caused the crash, a metric associated with the crash, a number of crash reports generated for the error, a type of device on which the crash occurred and an operating system of the device.

9. The method of claim 1, wherein the impact of the crash is determined as a function of a number of active users of the application and a number of those users affected by the crash.

10. The method of claim 1 further comprising:
    associating the task with a tag that describes a characteristic of the task.

11. The method of claim 10, wherein the associating the task with a tag further includes associating the task with a "launch blocker" tag, the "launch blocker" tag indicating that the error which caused the crash indicated by the task has a potential to prevent the application from being made available for end-users of the application.

12. The method of claim 1, wherein retrieving the crash reports includes retrieving the crash reports that are generated in a specified duration.

13. The method of claim 1, wherein retrieving the crash reports includes retrieving the crash reports for crashes by a specified error that is occurring a first version of the application but not in a second version of the application.

14. A non-transitory computer-readable storage medium storing computer-readable instructions, comprising:
    instructions for retrieving, from a first data source, multiple crash reports of an application indicating multiple instances of crashes of the application, wherein a specified crash report of the multiple crash reports includes information regarding an error that caused the application to crash at a client device;
    instructions for identifying a set of the crash reports generated for crashes caused by a specified error;
    instructions for confirming that a number of crash reports in the set of the crash reports exceed a first specified threshold;
    instructions for obtaining, from a second data source, a metric associated with crashes by the specified error, the metric quantifying an impact of the crashes by the specified error;
    instructions for confirming that the metric exceeds a second specified threshold; and
    instructions for assigning a task having information regarding the crashes by the specified error to a user for resolution of the specified error.

15. The non-transitory computer-readable storage medium of claim 14, wherein the instructions for assigning the task include:
  instructions for identifying a collection of crash reports generated for multiple versions of the application, the collection of crash reports generated for crashes of the application by an occurrence of the specified error in the different versions of the application, and
  instructions for generating a single task for all the crashes across the different versions of the application.

16. The non-transitory computer-readable storage medium of claim 14 further comprising:
  instructions for identifying a launch group of the application for which a first subset of the set of crash reports are generated, the launch group of the application being a specified version of the application made available to a subset of end-users of the application, the first subset of the crash reports indicating a crash of the specified version of the application in client devices of at least some of the subset of end-users.

17. The non-transitory computer-readable storage medium of claim 16 further comprising:
  instructions for determining whether a metric associated with the crash of the specified version of the application exceeds a third specified threshold, and
  instructions for notifying the user regarding the launch group of the application.

18. The non-transitory computer-readable storage medium of claim 14, wherein the impact of the crash includes is determined as a function of a number of active users of the application and a number of those users affected by the crash.

19. A system, comprising:
  a processor;
  a report retrieving module configured to retrieve, from a first data source, multiple crash reports of an application, wherein a specified crash report of the multiple crash reports includes information regarding an error that caused the application to crash, wherein different crash reports are generated for crashes caused by different errors;
  a metric retrieving module configured to obtain, from a second data source, a metric associated with the crash, the metric quantifying an impact of the crash, wherein the second module is further configured to determine if the metric exceeds a specified threshold; and
  a task manager module configured to, responsive to a determination that the metric exceeds the specified threshold, generate a task for the crash, the task including information regarding the crash from the specified crash report.

20. The system of claim 19 further comprising:
  a user identification module to identify a user to who the task is to be sent for resolution of the error that caused the crash, the fourth module configured to determine a specified user who last accessed a component of the application at which the error originated as the user.

* * * * *